United States Patent
Kwon (10) Patent No.: US 7,679,706 B2
(45) Date of Patent: Mar. 16, 2010

(54) LCD AND FABRICATING METHOD WITH COMMON ELECTRODE ON TOP SUBSTRATE HAVING AT LEAST TWO APERTURES DISPOSED TO FACE ABOUT MIDWAY OF PIXEL ELECTRODE ON BOTTOM SUBSTRATE

(75) Inventor: Soon-Wook Kwon, Suwon-si (KR)

(73) Assignee: Samsung Mobile Display Co., Ltd., Yongin, Gyunggi-Do (KR)

( * ) Notice: Subject to any disclaimer, the term of this patent is extended or adjusted under 35 U.S.C. 154(b) by 559 days.

(21) Appl. No.: 11/274,193

(22) Filed: Nov. 16, 2005

(65) Prior Publication Data
US 2006/0109411 A1 May 25, 2006

(30) Foreign Application Priority Data
Nov. 24, 2004 (KR) .................. 10-2004-0097155

(51) Int. Cl.
*G02F 1/1337* (2006.01)
(52) U.S. Cl. ...................... 349/130; 349/129
(58) Field of Classification Search .......... 349/129, 349/130
See application file for complete search history.

(56) References Cited

U.S. PATENT DOCUMENTS

| | | | |
|---|---|---|---|
| 6,285,431 B2 * | 9/2001 | Lyu et al. ............. | 349/143 |
| 6,476,898 B2 * | 11/2002 | Song et al. ............ | 349/139 |
| 6,600,540 B2 | 7/2003 | Yamakita et al. | |
| 6,714,271 B1 * | 3/2004 | Matsuyama et al. ...... | 349/123 |
| 6,714,276 B2 | 3/2004 | Towler et al. | |
| 6,852,374 B2 | 2/2005 | Mizusaki et al. | |
| 6,940,574 B2 * | 9/2005 | Lee et al. ............. | 349/129 |
| 7,019,762 B2 * | 3/2006 | Yoshihara et al. ...... | 345/690 |
| 2002/0105613 A1 * | 8/2002 | Yamakita et al. ....... | 349/143 |

FOREIGN PATENT DOCUMENTS

| | | |
|---|---|---|
| CN | 1317105 | 10/2001 |
| CN | 1371016 | 9/2002 |
| JP | 10-90708 | 4/1998 |
| JP | 2000-193975 | 7/2000 |
| JP | 2000-356775 | 12/2000 |

(Continued)

OTHER PUBLICATIONS

Chinese Office action issued on Jun. 29, 2007, corresponding to Chinese Patent Application No. 200510126834.8.

(Continued)

*Primary Examiner*—John Heyman
(74) *Attorney, Agent, or Firm*—Robert E. Bushnell, Esq.

(57) ABSTRACT

A liquid crystal display and method of fabricating the same. The liquid crystal display includes a bottom substrate. A pixel electrode is arranged on the bottom substrate. A top substrate is arranged above the bottom substrate to have an opposing surface which faces the bottom substrate. An common electrode having at least one aperture is arranged on this opposing surface of the top substrate. A liquid crystal layer is arranged between the pixel electrode and the common electrode. Thus the bend transition time and the bend transition voltage may be reduced without decreasing the aperture ratio.

10 Claims, 6 Drawing Sheets

FOREIGN PATENT DOCUMENTS

| | | |
|---|---|---|
| JP | 2001-042367 | 2/2001 |
| JP | 2001-183666 | 7/2001 |
| JP | 2002-268076 | 9/2002 |
| JP | 3334715 | 10/2002 |
| JP | 2002-357808 | 12/2002 |
| JP | 2003-107478 | 4/2003 |
| JP | 2003-107531 | 4/2003 |
| JP | 2003-140194 | 5/2003 |
| JP | 2003-228085 | 8/2003 |
| JP | 2004-272112 | 9/2004 |
| KR | 10-2000-0059770 | 10/2000 |
| KR | 1020010031564 | 6/2001 |
| KR | 1020010088285 | 9/2001 |
| KR | 1020010090761 | 10/2001 |
| KR | 1020030007066 | 1/2003 |
| KR | 1020030053829 | 7/2003 |
| KR | 1020030069810 | 8/2003 |
| KR | 1020040062099 | 7/2004 |

OTHER PUBLICATIONS

Japanese Office Action issued on Jul. 29, 2008 on corresponding Japanese Patent Application No. 2005-186430.

Ogawa et al., "Field-Sequential-Color LCD Using Switched Organic EL Backlighting", Society for Information Display, Toyota Motor Corp., Japan, pp. 1098-1101.

Request for Entry of the Accompanying Office Action (for non-English document).

Office action from Japanese Patent Office issued in Applicant's corresponding Japanese Patent Application No. 2005-186430 dated Oct. 27, 2009.

* cited by examiner

LCD AND FABRICATING METHOD WITH COMMON ELECTRODE ON TOP SUBSTRATE HAVING AT LEAST TWO APERTURES DISPOSED TO FACE ABOUT MIDWAY OF PIXEL ELECTRODE ON BOTTOM SUBSTRATE

CLAIM OF PRIORITY

This application makes reference to, incorporates the same herein, and claims all benefits accruing under 35 U.S.C §119 from an application entitled LIQUID CRYSTAL DISPLAY COMPRISING OPPOSITE ELECTRODE HAVING HOLE AND FABRICATION METHOD OF THE SAME earlier filed in the Korean Industrial Property Office on 24 Nov. 2004, and there duly assigned Serial No. 2004-97155 by that Office.

BACKGROUND OF THE INVENTION

1. Field of the Invention

The present invention relates to a liquid crystal display (LCD) and method of fabricating the same and, more particularly, to an LCD having a patterned opposing common electrode including apertures and method of fabricating the same.

2. Description of the Related Art

An LCD has a liquid crystal injected between a pixel electrode and an opposing common electrode, and changes alignment of the liquid crystal by applying an electric field between the pixel electrode and the opposing common electrode. The changed alignment of the liquid crystal controls transmittance of light to form images.

Among various types of LCDs, an optical controlled birefringence (OCB) type LCD has a fast response speed and an excellent viewing angle. The OCB type LCD includes a pixel electrode, a bottom alignment layer, an opposing common electrode, a top alignment layer, and a liquid crystal layer with nematic liquid crystals having positive dielectric constant anisotropy $\Delta\epsilon$. The bottom and top alignment layers are rubbed in the same direction, so that the liquid crystals have a splay alignment. In order to form images in the OCB type LCD, a high electric field should be formed between the pixel electrode and the opposing common electrode. The high electric field changes a tilt angle of the liquid crystals located at a center of the liquid crystal layer to an angle of 90° so that the liquid crystals have a bend alignment. This is referred to as a bend transition. A predetermined voltage is applied between the pixel electrode and the opposing common electrode to induce change of a tilt angle of the rest of the liquid crystals other than the liquid crystals adjacent to the alignment layers and the liquid crystals located at the center. Thus, polarization of light which passes through the liquid crystal layer is changed to form the images.

In order for the LCD having a plurality of pixels to realize high resolution images, most of the liquid crystals arranged in the plurality of pixels should be bend-transitioned. However, this requires a lengthy time, and pixels which are not bend-transitioned may occur. In order to prevent this, a voltage is increased for the bend transition, leading to high power consumption.

In order to solve the problem, Japanese Publication No. 2003-140194 discloses an LCD with a pixel electrode having a groove portion or a protruding portion. However, it may reduce an aperture ratio to form the groove portion or the protruding portion in the pixel electrode.

Discussions on OCB type LCDs are found in the following references, incorporated by reference: U.S. Pat. No. 6,600, 540 to Hiroyuki Yamakita et al. and titled LIQUID CRYSTAL DISPLAY discusses a liquid crystal display comprising a pair of opposed substrates, a liquid crystal layer disposed between the pair of substrates, a storage capacitor electrodes provided on one of the pair of substrates, and pixel electrodes provided so as to overlap with the storage capacitor electrodes, the pixel electrode having an aperture in a region overlapping with the storage capacitor electrode; U.S. Pat. No. 6,714,276 to Michael John Towler et al. and titled LIQUID CRYSTAL DISPLAY DEVICE discusses a reflective liquid crystal display comprising a pair of opposed substrates, a liquid crystal layer disposed between the pair of substrates, transparent electrodes and reflective electrodes provided with via-hole regions functioning as a nucleation regions; and U.S. Pat. No. 6,852,374 to Masanobu Mizusaki et al. and titled LIQUID CRYSTAL DISPLAY DEVICE, OPTICAL ELEMENT, METHOD OF FABRICATING THE LIQUID CRYSTAL DISPLAY DEVICE AND METHOD OF MAKING THE OPTICAL ELEMENT which discusses a liquid crystal display device (LCD), an optical element, a method of fabricating the LCD and a method of making the optical element, and also relates to a material of a liquid crystal alignment film that can be used effectively in the LCD or the optical element.

SUMMARY OF THE INVENTION

The present invention, therefore, solves aforementioned problems associated with conventional devices by providing an LCD which may reduce a bend transition time and a bend transition voltage and method of fabricating the same.

In an exemplary embodiment of the present invention, a liquid crystal display includes: a bottom substrate; a pixel electrode arranged on the bottom substrate; a top substrate arranged above the bottom substrate and having an opposite surface which faces the bottom substrate; an opposing common electrode arranged on the opposite surface of the top substrate and having at least one aperture; and a liquid crystal layer arranged between the pixel electrode and the opposing common electrode.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to the embodiments of the present invention, examples of which are illustrated in the accompanying drawings, wherein like reference numerals refer to the like elements throughout. The embodiments are described below in order to explain the present invention by referring to the figures. In the drawings, if it is arranged "on" a different layer or a substrate, it may mean that it is arranged directly on the different layer or the substrate or another layer may be arranged therebetween.

Figure 1:
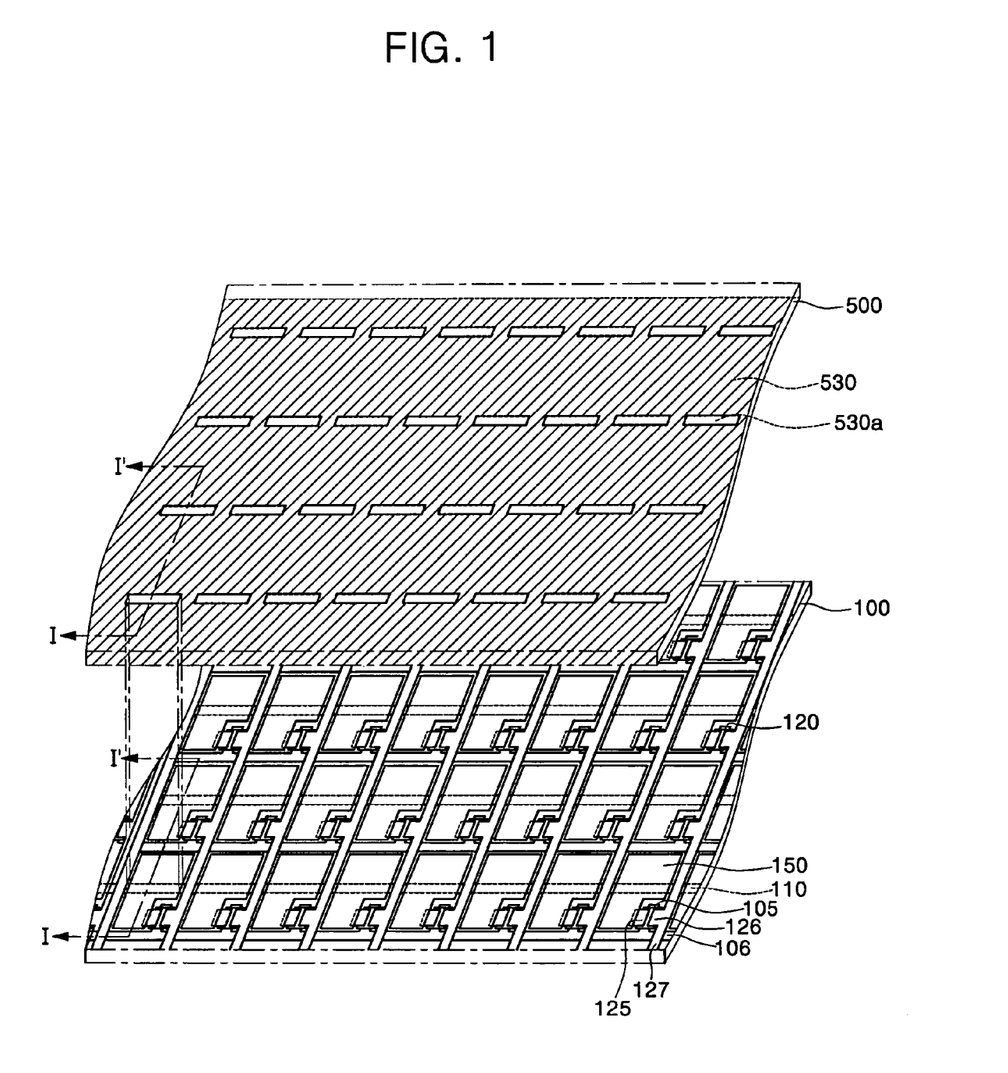
FIG. 1 is a perspective view of an LCD according to an embodiment of the present invention, where a bottom substrate and a top substrate are shown.

FIG. 1 is a perspective view of an LCD according to an embodiment of the present invention, where a bottom substrate and a top substrate are shown.

Referring to FIG. 1, a pixel electrode 150 is arranged on a bottom substrate 100. On the bottom substrate 100, a plurality of scan lines 106 may be arranged in one direction and a plurality of data lines 127 may be arranged in a perpendicular direction to the scan lines 106. As a result, unit pixel regions are defined by the intersection of the scan lines 106 and the data lines 127. In such instance, the pixel electrode 150 is located at each unit pixel region, i.e., at a region which is defined by the interconnection of each scan line 106 and each data line 127.

On each unit pixel region, a thin film transistor (TFT) is located which is switched by control of the scan line 106 to apply a voltage applied to the data line 127 to the pixel electrode 150. The TFT includes a gate electrode 105 which protrudes from the scan line 106, a semiconductor layer 120 which is located on the gate electrode 105 and overlaps the gate electrode 105, a source electrode 126 which protrudes from the data line 127 and contacts one end of the semiconductor layer 120, and a drain electrode 125 which contacts the other end of the semiconductor layer 120 and the pixel electrode 150.

A storage capacitor bottom electrode 110 may be located below the pixel electrode 150 to cross the pixel electrode 150. The storage capacitor bottom electrode 110 may be arranged parallel to the scan line 106. The storage capacitor bottom electrode 110 and the pixel electrode 150 form a storage capacitor. The storage capacitor serves to store pixel information during a non-selection period.

A top substrate 500 having an opposite surface (or opposing surface) to the bottom substrate 100 is arranged above the bottom substrate 100. An opposing common electrode 530 having at least one aperture 530a is arranged on the mentioned opposite, or opposing, surface of the top substrate 500. Each aperture 530a may overlap at least a part of the pixel electrode 150. The aperture 530a may further overlap (or may parallel) at least a part of the storage capacitor bottom electrode 110.

Figure 2:
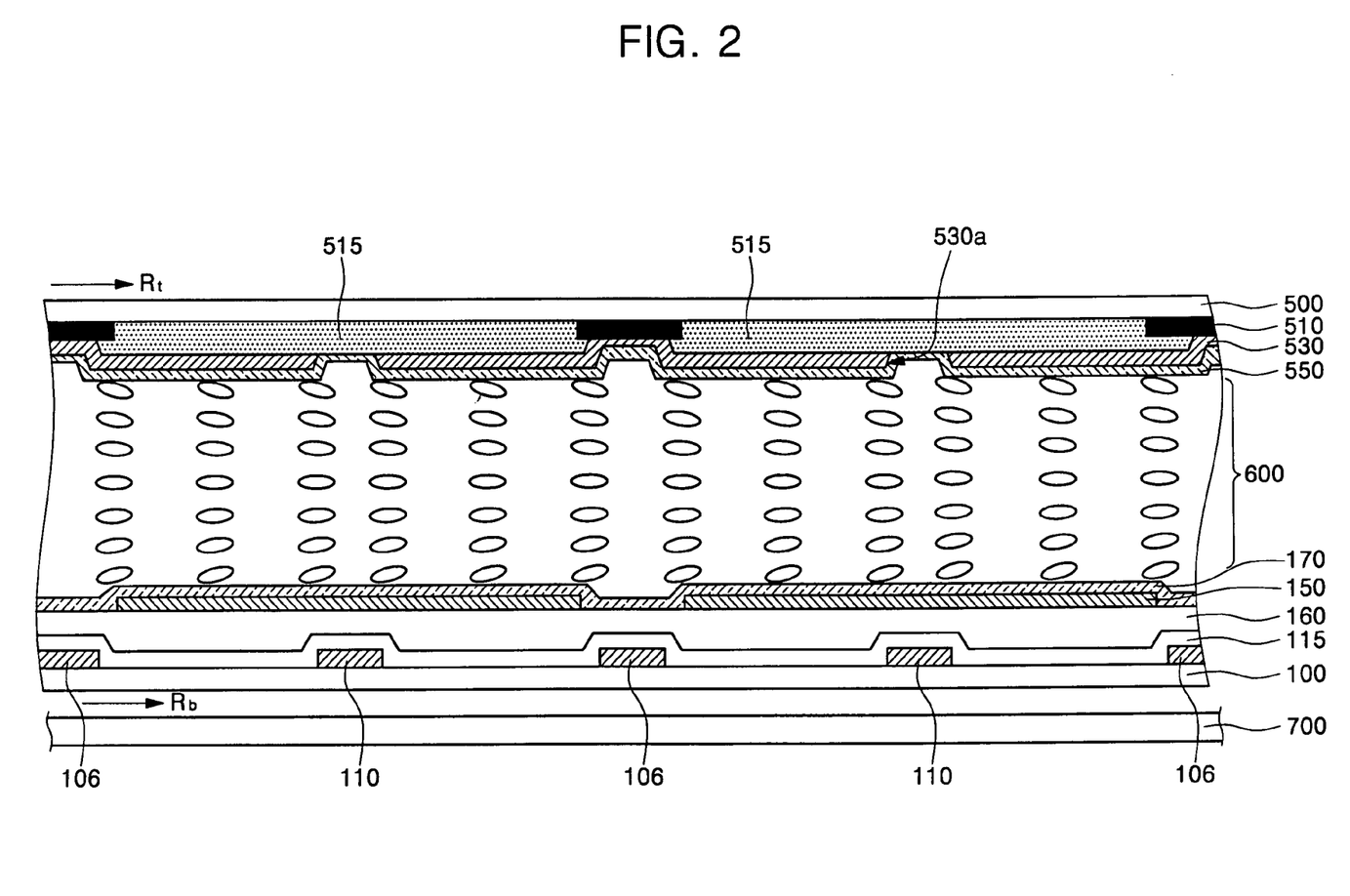
FIG. 2 is a cross-sectional view taken along the line I-I' of FIG. 1, which illustrates the LCD and method of fabricating the same.

FIG. 2 is a cross-sectional view taken along the line I-I' of FIG. 1, which illustrates the LCD and method of fabricating the same.

Referring to FIGS. 1 and 2, a gate conductive layer is deposited on a bottom substrate 100 and patterned to form a scan line 106, a gate electrode 105 which protrudes from the scan line 106, and a storage capacitor bottom electrode 110 which is spaced apart from the scan line 106 and parallel to the scan line 106. A gate insulating layer 115 is formed on the scan line 106, the storage capacitor bottom electrode 110 and the gate electrode 105. An amorphous silicon layer is deposited on the gate insulating layer 115 and then patterned to form a semiconductor layer 120 which overlaps the gate electrode 105.

Subsequently, source and drain conductive layers are deposited over the bottom substrate having the semiconductor layer 120 and then patterned to form a data line 127, a source electrode which protrudes from the data line 127 and contacts one end of the semiconductor layer 120, and a drain electrode 125 which contact the other end of the semiconductor layer 120, thereby forming the TFT.

A passivation layer 160 is formed on the source and drain electrodes 125 and 126. The passivation layer 160 is patterned to form a contact hole which exposes a predetermined portion of the drain electrode 125. A pixel conductive layer is formed on the passivation layer 160 and then patterned to form a pixel electrode 150 which contacts the drain electrode 125 via the contact hole. Then, a bottom alignment layer 170 is formed over the entire surface of the bottom substrate 100 having the pixel electrode 150.

A process of rubbing the bottom alignment layer 170 in one direction, Rb, is performed such that the bottom alignment layer 170 is parallel-aligned and has a predetermined pretilt angle.

Meanwhile, a top substrate 500 is prepared, and a light shielding layer pattern 510 is formed on one surface of the top substrate 500 (the surface opposing the bottom substrate 100). The light shielding layer pattern 510 shields regions of the bottom substrate 100 which the TFT, the data line 127 and the scan line 106 are formed. Thus, the light shielding layer pattern 510 exposes a portion of the top substrate 500 corresponding to the pixel electrode 150. A color filter layer 515 is formed on the exposed portion of the top substrate 500.

An opposite conductive layer is deposited on the color filter layer 515 and then patterned to form an opposing common electrode, i.e., a common electrode, 530 having at least one aperture 530a. Each aperture 530a may overlap at least a part of the pixel electrode 150. The aperture 530a may further overlap at least a part of the storage capacitor bottom electrode 110.

A top alignment layer 550 is formed on the common electrode 530 having the aperture 530a. The top alignment layer 550 is rubbed in the same direction, Rt, as the bottom alignment layer 170. The rubbing process is performed such that the top alignment layer 550 is parallel-aligned and has a predetermined pretilt angle.

Subsequently, the bottom substrate 100 and the top substrate 500 are attached to each other with a predetermined interval therebetween. A liquid crystal is injected into a space between the bottom substrate 100 and the top substrate 500 to form a liquid crystal layer 600. Preferably, the liquid crystal is a nematic liquid crystal and has positive dielectric constant anisotropy. Among the liquid crystals of the liquid crystal layer 600, the liquid crystals adjacent to the bottom and top alignment layers 170 and 550 are respectively parallel-aligned with a predetermined pretilt angle in the rubbing directions Rb and Rt by an anchoring force of the alignment-treated alignment layers. The liquid crystals arranged at a center of the liquid crystal layer 600 are aligned almost parallel to the bottom and top substrates 100 and 500. Thus, the liquid crystals of the liquid crystal layer 600 have a splay alignment.

The LCD may have a back light 700 which emits white light below the bottom substrate 100. Such type of the LCD may realize color images using the color filter layer 515.

Alternatively, red (R), green (G), and blue (B) back lights 700 may be arranged below the bottom substrate 100. In such instance, the color filter layer 515 may be omitted. Such type of the LCD is referred to as a field sequential LCD (FS-LCD). The FS-LCD sequentially displays red (R), green (G), and blue (B) light in a time division manner through the liquid crystal corresponding to one unit pixel to thereby realize the color images using a residual image. This is sufficiently fast in response speed and thus suitable for realizing a moving picture.

Figure 3A:
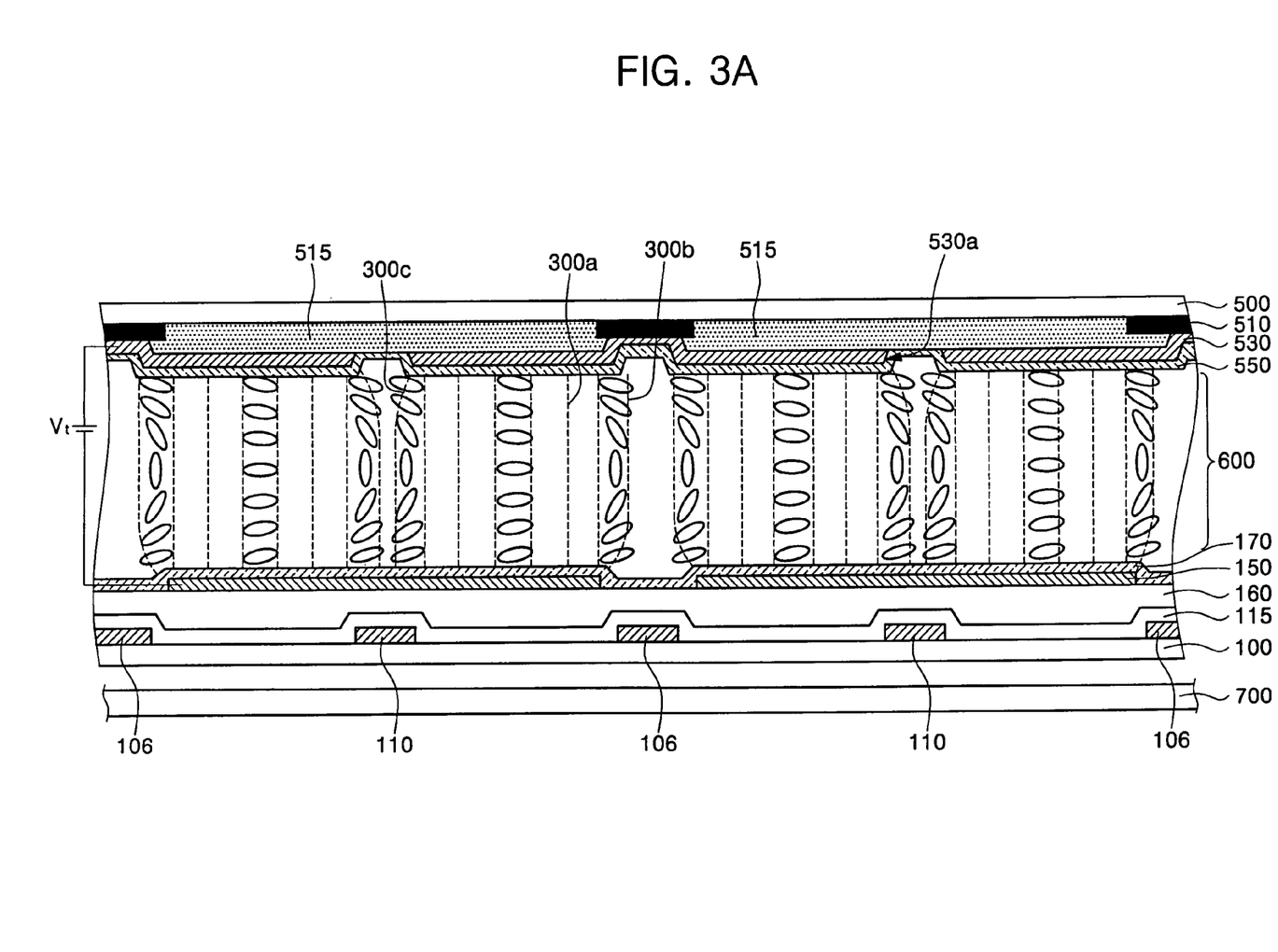
FIGS. 3a and 3b are cross-sectional views for explaining a bend transition of the LCD of FIG. 2.
Figure 3B:
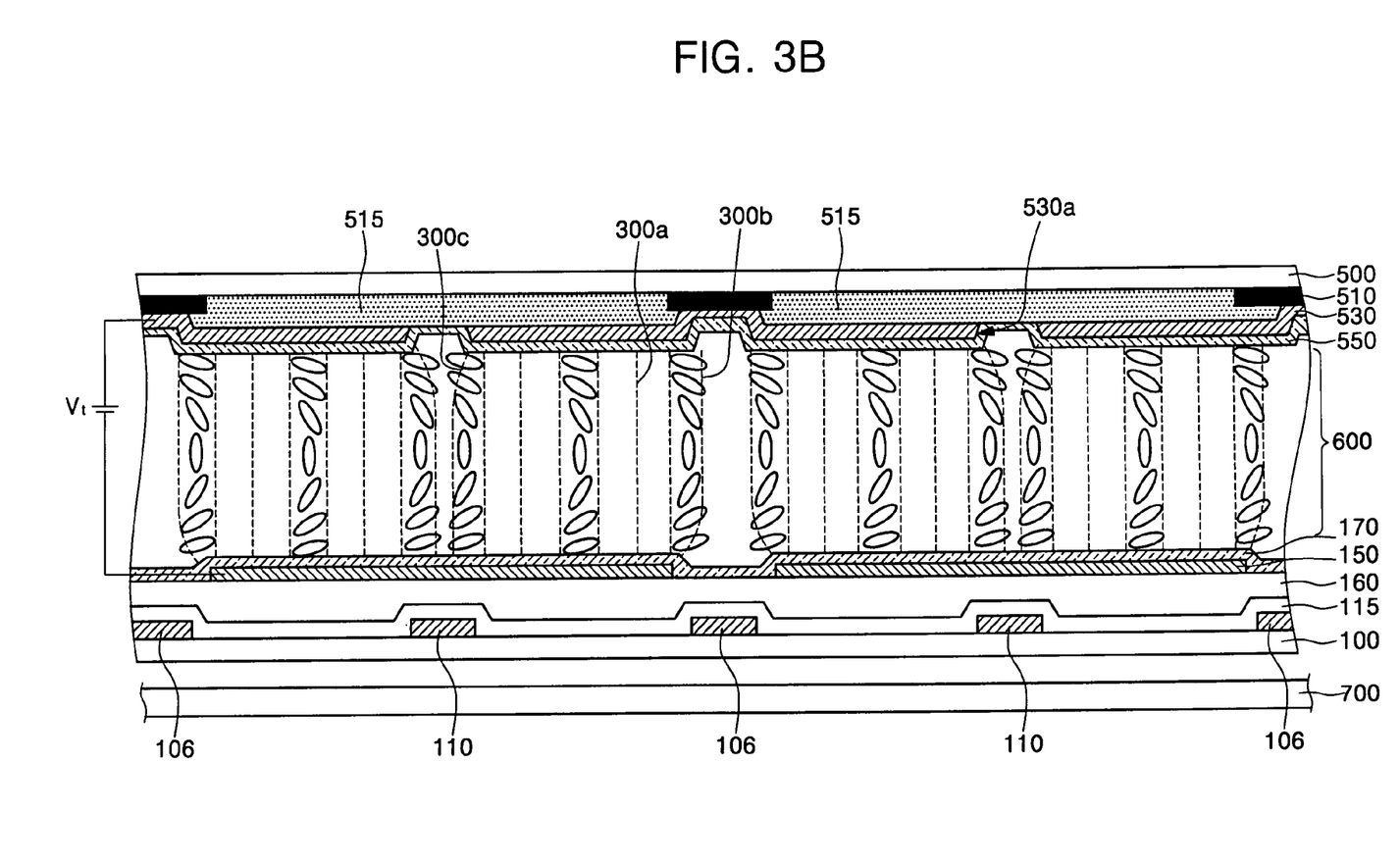

FIGS. 3A and 3B are cross-sectional views for explaining a bend transition of the LCD of FIG. 2.

Referring to FIG. 3A, a voltage is applied to common (opposite) electrode 530 and pixel electrode 150, so that common electrode 530 and the pixel electrode 150 have a voltage difference Vt therebetween. As a result, electric fields 300a, 300b, and 300c are formed between the common electrode 530 and the pixel electrode 150. In more detail, the electric field 300a is formed in a vertical straight line direction at a portion where a surface of the common electrode 530 faces a surface of the pixel electrode 150. However, bent electrical fields 300b and 300c are formed in a vertical direction between an edge of the pixel electrode 150 and the common electrode 530 and between an edge of the common electrode 530 and the pixel electrode 150. Distortion of the electrical field occurred at the edges of the electrodes 150 and 530 rapidly transitions adjacent liquid crystals from the splay alignment to the bend alignment. Accordingly, a transitional source may be more rapidly formed at the edge of the electrodes 150 and 530.

Referring to FIG. 3B, the bend alignment of the liquid crystals formed at the edges of the electrodes 150 and 530, i.e., the bend transition is propagated to the rest of the regions from the transitional source. Therefore, the liquid crystals of the whole liquid crystal layer 600 are transitioned to the bend alignment. In other words, when an initial transition voltage Vt is applied, the transitional source is formed at the edges of the pixel electrode 150 and the common electrode 530, and the bend transition is propagated from the transitional source to the whole liquid crystal layer 600.

The apertures 530a (see FIGS. 3B and 4) formed in the common electrode 530 serve to increase the edge of the common electrode 530. Therefore, by forming the apertures 530a in the common electrode 530, when the initial transition voltage Vt is applied, the bend-transitioned liquid crystals, i.e., formation of the transitional source may be increased. Accordingly, a time required to propagate the bend transition to the whole liquid crystal layer 600, i.e., the transition time may be reduced and the transition voltage may also be reduced.

Figure 4:
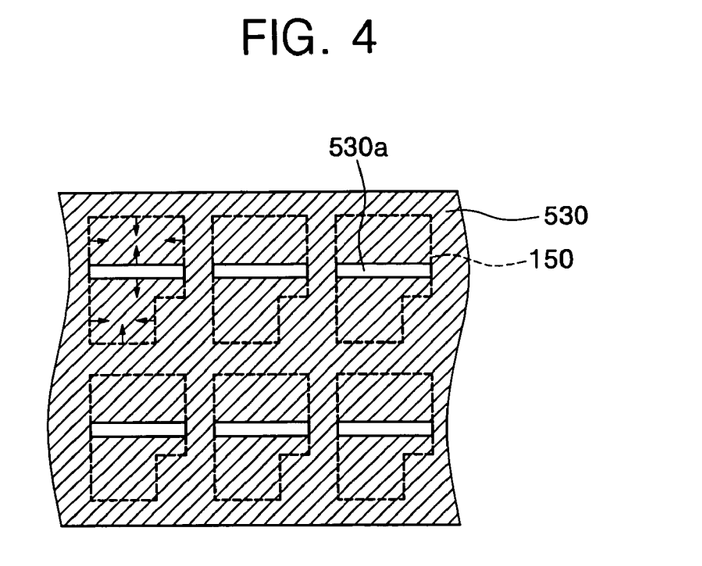
FIGS. 4 to 7 are plan views showing various shapes of apertures formed in an opposing common electrode.

Each aperture 530a may overlap at least a part of the pixel electrode 150. Thus, a lot of regions that the distorted electrical field is formed may be formed to thereby form the transitional source much more. In addition, the aperture 530a may overlap the storage capacitor bottom electrode 110. Thus, the transitional source may be increased without reducing an aperture ratio.

Thereafter, a voltage difference between the pixel electrode 150 and the common electrode 530 is maintained to be higher than a critical voltage for maintaining the bend alignment. Then, when the voltage difference is increased, tilt angles of the rest of the liquid crystals, except the liquid crystals adjacent to the alignment layers 170 and 550, and the liquid crystals located at a center of the liquid crystal layer 600 are increased, and then when the voltage difference is decreased, the tilt angles are reduced. Accordingly, polarization of light which passes through the liquid crystal layer 600 is changed to thereby form images. The change of the tilt angles of the liquid crystals is very fast so that the fast response speed characteristics may be realized. The LCD described above is referred to as an OCB type LCD. It is preferred that the OCB type LCD is driven in the field sequential driving method to realize faster response speed.

FIGS. 4 to 7 are plan views showing various shapes of apertures formed in an common electrode.

Referring to FIG. 4, a aperture 530a is formed to cross the pixel electrode 150. Since the edge of the common electrode 530 which overlaps the pixel electrode 150 is formed in two directions, the bend transition may be uniformly propagated.

Figure 5:
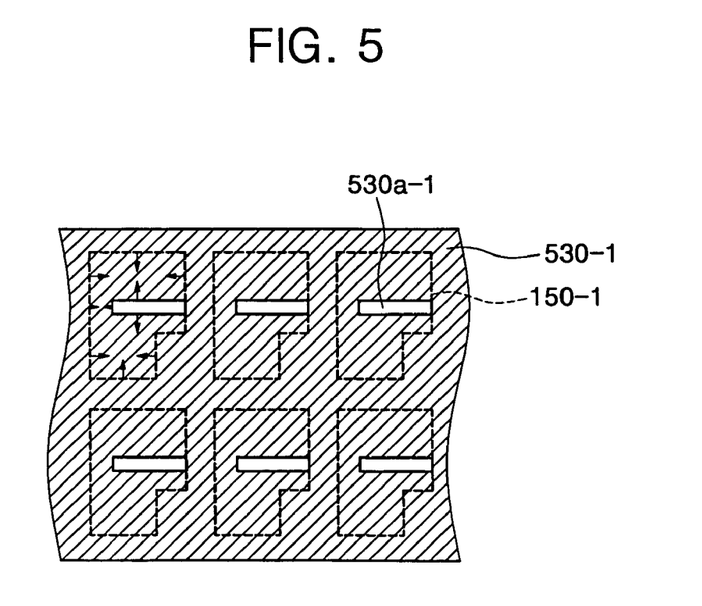

Referring to FIG. 5, a aperture 530a-1 is formed in the form similar to FIG. 4, but the edges of the common electrode 530-1 which overlaps the pixel electrode 150-1 is increased.

Figure 6:
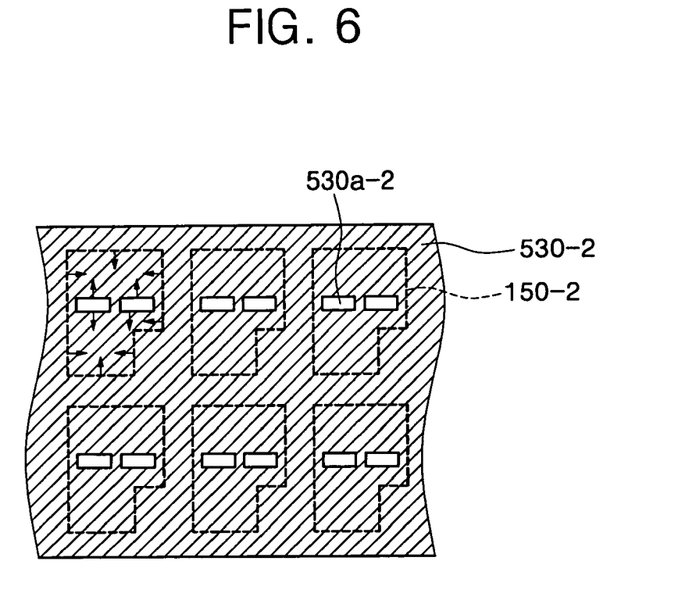
Figure 7:
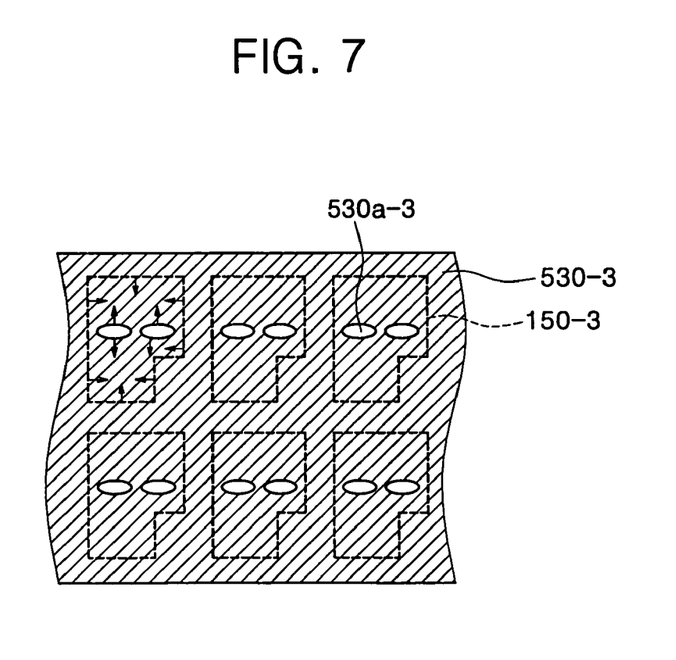

Referring to FIGS. 6 and 7, a plurality of apertures 530a-2 or 530a-3 overlap one pixel electrode 150-2 or 150-3. The edges of the common electrode 530-2 or 530-3 which overlaps the pixel electrode 150-2 or 150-3 may be increased.

As described above, more transitional sources can be produced by increasing the edges of the common electrode which overlaps the pixel electrode, thereby reducing the transition time and the transition voltage.

Therefore, according to the present invention, the bend transition time and the bend transition voltage may be reduced without decreasing the aperture ratio.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A liquid crystal display comprising:
   a bottom substrate;
   a pixel electrode arranged on the bottom substrate;
   a top substrate arranged above the bottom substrate and having an opposing surface which faces the bottom substrate;
   a common electrode arranged on said opposing surface of the top substrate, said common electrode having at least one aperture;
   a bottom alignment layer arranged on the pixel electrode, the bottom alignment layer being rubbed in a predetermined direction;
   a top alignment layer arranged on the common electrode, the top alignment layer being rubbed in the predetermined direction; and
   a liquid crystal layer arranged between the pixel electrode and the common electrode, wherein the pixel electrode overlaps with the at least one aperture to completely cover the at least one aperture.

2. The display of claim 1, further comprising a storage capacitor bottom electrode arranged between the pixel electrode and the bottom substrate, the storage capacitor bottom electrode and the pixel electrode forming a storage capacitor, the at least one aperture overlapping with the storage capacitor bottom electrode.

3. The display of claim 1, wherein the liquid crystal layer has a nematic liquid crystal of positive dielectric constant anisotropy.

4. The display of claim 1, further comprising a scan line and a data line, the pixel electrode being arranged at a region defined by the scan line and the data line.

5. The display of claim 1, wherein the liquid crystal display is a field sequential liquid crystal display further comprising red (R), green (G) and blue (B) backlights arranged below the bottom substrate.

6. The display of claim 1, wherein liquid crystals arranged at a center of the liquid crystal layer are aligned substantially parallel to the bottom substrate in absence of voltage to the liquid crystal layer.

7. A method of fabricating a liquid crystal display, comprising:
   forming a pixel electrode on a bottom substrate;
   forming a common electrode, having at least one aperture, on a top substrate;
   attaching the top and bottom substrates such that the common electrode faces the pixel electrode;

forming a bottom alignment layer on the pixel electrode and rubbing the bottom alignment layer in a predetermined direction;

forming a top alignment layer on the common electrode and rubbing the top alignment layer in said predetermined direction; and forming a liquid crystal layer by injecting liquid crystals into a space between the top and bottom substrates, wherein the pixel electrode overlaps with the at least one aperture to completely cover the at least one aperture.

8. The method of claim 7, further comprising forming a storage capacitor bottom electrode between the pixel electrode and the bottom substrate before forming the pixel electrode, the storage capacitor bottom electrode and the pixel electrode forming a storage capacitor, the at least one aperture overlapping with the storage capacitor bottom electrode.

9. The method of claim 7, wherein the liquid crystal layer has a nematic liquid crystal of positive dielectric constant anisotropy.

10. The display of claim 7, wherein liquid crystals arranged at a center of the liquid crystal layer are aligned substantially parallel to the bottom substrate in absence of voltage to the liquid crystal layer.

* * * * *